Patented Mar. 13, 1951

2,544,899

UNITED STATES PATENT OFFICE 2,544,899

METHOD FOR MAKING CYCLIC ETHERS

Delbert D. Reynolds and William O. Kenyon, Rochester, N. Y., assignors to Eastman Kodak Company, Rochester, N. Y., a corporation of New Jersey No Drawing. Application June 1, 1949, Serial No. 96,620

18 Claims. (Cl. 260—333)

This invention relates to an improved method for making cyclic ethers. More particularly this invention relates to an improved method for making tetrahydrofurans and tetrahydropyrans.

It is known that certain cyclic ethers can be prepared by heating certain glycols in the presence of dehydrating agents. Such methods have the disadvantage that the primary reaction leading to the formation of the desired cyclic ethers is accompanied by side reactions, such as olefin formation, charring, etc., which it would be desirable to avoid.

We have found a convenient method for preparing such cyclic ethers which largely, or entirely avoids in many cases, the disadvantages inherent in the prior art methods.

It is, therefore, an object of our invention to provide an improved method for making cyclic ethers. A further object of our invention is to provide a method for preparing cyclic ethers in increased yields. Other objects will become apparent from a consideration of the following description and examples.

According to our invention we prepare cyclic ethers by reacting certain glycols with certain sulfonyl halides in the presence of tertiary amines selected from those of the pyridine series and those of the quinoline series.

The glycols useful in practicing our invention are advantageously those wherein the hydroxyl groups are separated from one another by from 4 to 5 carbon atoms. These glycols can be described as dihydroxyalkanes wherein the two hydroxyl groups are separated from one another by from 4 to 5 carbon atoms. Such glycols have the chain structure:

I
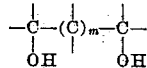

wherein $m$ represents a positive integer from 2 to 3. The glycols which have been found to be most useful for our invention comprise those represented by the following general formula:

II
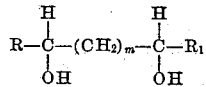

wherein R and $R_1$ each represents a hydrogen atom, an alkyl group, such as methyl, ethyl, n-propyl, etc. groups or an aryl group, such as a phenyl ($C_6H_5$—) group, etc. Typical glycols include, for example, 1,4-butanediol, 2,2-dimethyl-butanediol-1,4, 1,4-pentanediol, 1,5-pentanediol, 1,4-hexanediol, 1,5-hexanediol, 2,5-hexanediol, 1,4-heptanediol, 1,5-heptanediol, 2,5-heptanediol, 2,6-heptanediol, etc.

As sulfonyl halides we can advantageously use the sulfonyl halides represented by the following general formula:

III $\quad R_2-SO_2-X$ wherein $R_2$ represents a member selected from the group consisting of an alkyl group, e. g., methyl, ethyl, n-propyl, isopropyl, n-butyl, isobutyl, etc. groups (e. g., an alkyl group of the formula $C_nH_{2n+1}$ wherein $n$ is a positive integer from 1 to 4) and an aryl group, e. g., phenyl, p-nitrophenyl, o-, m- and p-tolyl, α- and β-naphthyl, etc., groups, and X represents a halogen atom, for example, a chlorine atom or a bromine atom.

Typical tertiary amines useful in practicing our invention include heterocyclic amines, e. g. pyridine, α-, β- and γ-picolines, 2,4-lutidine, 2,5-lutidine, 3,4-lutidine, 2,6-lutidine, α-, β- and γ-collidines, α- and β-parvolines (2,4- and 3,4-diethyl-pyridines), 2,3,4,5-tetramethylpyridine, 2 - n - butylpyridine, 3-n-butylpyridine, 2-sec-butylpyridine, 4-tert.-butylpyridine, 2-ethyl - 3,5 - dimethylpyridine, 5-isopropyl-2-methylpyridine, 6-isopropyl-3-methylpyridine, quinoline, isoquinoline, lepidine, etc., tertiary aliphatic amines, e. g. triethyl amine, tri-n-butyl amine, etc., tertiary aromatic amines, N,N-dimethylaniline, N,N-diethylaniline, etc. Organic tertiary amines which have been found to be most useful for the purposes of our invention comprise pyridine and its homologs containing from 5 to 9 carbon atoms in the molecule, e. g. compounds represented by the following general formula:

IV
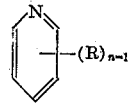

wherein R represents an alkyl group (same or different) of the formula $C_mH_{2m+1}$ wherein $m$ represents a positive integer from 1 to 4, and $n$ represents a positive integer from 1 to 5, and wherein the total number of carbon atoms in the R groups does not exceed four in number. Quinoline has also been found to be especially useful for the purposes of our invention. Generally when $m$ in the above formulas is 3 and the hydroxyl groups are primary, certain amines, such as pyridine, β-picoline, γ-picoline, and certain others do not afford as high yields as amines of the α-picoline, lutidine, etc., types which have a substituent attached to the carbon atom adjacent to be the ring nitrogen atom.

We have found that when one of the glycols represented by Formulas I and II above are acylated with an acid halide represented by Formula III above in the presence of an excess of one of the amines selected from those of the pyridine series and those of the quinoline series, as represented by those of Formula IV above, for example, a monoester of the glycol is formed and this monoester immediately undergoes reaction with the excess amine leading to the formation of the desired cyclic ethers. This mode of procedure has the advantage that no special cooling means is generally necessary and the reaction mixture can be refluxed during or after the addition of the sulfonic acid halide to give a high yield of cyclic ether. This procedure can be illustrated by the following general equations:

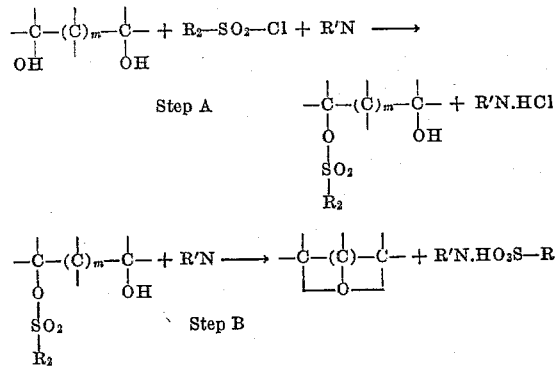

wherein $R_2$ and $m$ have the above values and $R'$ representing the residue of tertiary amine, e. g. pyridine. Generally for the purposes of our invention we prefer to react one of the glycols represented by the above Formulas I and II with the acid halides (e. g. chloride) of one of the sulfonic acids of Formula III in an excess of a tertiary amine of the pyridine or quinoline series. Steps A and B as represented by the above equation can be carried out separately, if desired. However, there is generally no advantage in doing so. If the reaction is carried out stepwise, the temperature of Step A should be restricted to about 0°–15° C., while no such precaution is necessary for Step B, which can advantageously be carried out at the refluxing temperature of the reaction mixture, or temperatures varying from about 60° C. to the reflux temperature of the reaction mixture.

Inert solvents can be employed, if desired, however the tertiary amines useful in practicing the process of our invention are excellently suited as solvents, and generally no added solvent is necessary.

The following examples will illustrate more fully the manner whereby we practice the process of our invention.

*Example 1.—$\alpha,\alpha'$-Dimethyltetrahydrofuran, pyridine-benzenesulfonyl chloride method*

118 g. of 2,5-hexanediol were mixed with 300 g. of anhydrous pyridine and the mixture heated to reflux in a glass helices-packed column four feet in height, which was equipped with a variable reflux take-off head. While the reaction mixture was refluxing, 176 g. of benzenesulfonyl chloride were added drop-wise over a period of 1¼ hours. After the benzenesulfonyl chloride had been added, the reaction product was separated by distillation. A yield of 97 g. of a product boiling at 90°–110° C. was obtained. This product was redistilled over calcium hydride through a Podbielniak column. The following fractions were obtained:

| Fraction | Yield | B. P. | C | H |
|---|---|---|---|---|
| | Grams | °C. | | |
| 1st | 3 | 90–92 | 72.1 | 12.0 |
| 2nd | 75 | 92–93 | 72.0 | 11.9 |
| 3rd | 8 | 93–94 | 71.8 | 11.9 |

The theoretical values for $\alpha,\alpha'$-dimethyltetrahydrofuran are carbon 72.0 per cent and for hydrogen, 12.0 per cent. There were obtained 86 g. of a pure product representing an 86 per cent yield.

*Example 2.—$\alpha,\alpha'$-Dimethyltetrahydrofuran, pyridine-p-toluenesulfonyl chloride method*

The procedure of this example was identical to that of Example 1 above, except that 200 g. of p-toluenesulfonyl chloride dissolved in 200 g. of anhydrous pyridine were used in place of the benzene sulfonyl chloride of the above example. From the reaction mixture, 96 g. of product were obtained, which boiled at 90°–105° C. The product was then distilled over calcium hydride through a Podbielniak column, the following fractions were obtained:

| Fraction | Yield | B. P. | C | H |
|---|---|---|---|---|
| | Grams | °C. | | |
| 1st | 7.5 | 90–92 | 71.9 | 11.9 |
| 2nd | 75 | 92–03 | 71.9 | 11.9 |
| 3rd | 3 | 93–95 | 73.0 | 12.0 |

The first two fractions above represent an 82.5% yield of pure product.

*Example 3.—$\alpha,\alpha'$-Dimethyltetrahydrofuran, 2,6-lutidine-methanesulfonyl chloride method*

The procedure used in this example was similar to that of Example 1 above except that 115 g. of methanesulfonyl chloride were used in place of the benzenesulfonyl chloride, and the pyridine was replaced by a molecularly equivalent amount of 2,6-lutidine. During the course of this reaction, it was noted that gaseous sulfur dioxide was formed. This sulfur dioxide formed a crystalline addition compound with the 2,6-lutidine, and this addition compound distilled over with the $\alpha,\alpha'$-dimethyltetrahydrofuran to give a distillate which had a cloudy appearance. This addition compound was easily removed by washing the distillate with water, whereupon the pure $\alpha,\alpha'$-dimethyltetrahydrofuran was obtained. In this example, 97 g. of cloudy distillate were obtained, which was mixed with two volumes of ether and then washed with two 30 cc. portions of water. The ether solution was then dried over calcium chloride, followed by distillation over calcium hydride. There were thus obtained 64 g. of $\alpha,\alpha'$-dimethyltetrahydrofuran having a boiling point of 92°–94° C., representing a 64% yield. On analysis, the pure compound was found to contain 72% carbon and 11.7% hydrogen.

*Example 4.—Tetrahydropyran, pyridine-benzenesulfonyl chloride method*

104 g. of 1,5-pentanediol and 300 cc. of anhydrous pyridine were heated to reflux in a four-foot glass-packed column with a variable take-off head. While the mixture was then refluxed, 176 g. of benzenesulfonyl chloride were added dropwise over a two-hour period. After the addition was completed, the reaction mixture was distilled to give 13.5 g. of product having a boiling point of 87°–109° C. The distillate was refractionated to give five g. of pure tetrahydropyran having a boiling point of 87.5°–88.5° C. This example shows that tertiary amines having no substituent attached to the carbon atom adjacent to the nitrogen atom thereof, do not give yields comparable to certain other tertiary amines.

*Example 5.—Tetrahydropyran, 2,6-lutidine-benzenesulfonyl chloride method*

A mixture of 104 g. of 1,5-pentanediol and 300 g. of anhydrous 2,6-lutidine was heated to reflux, using a four-foot column packed with glass helices and equipped with a variable take-off head. There were then added 176 g. of benzene sulfonyl chloride over a period of two hours while the mixture was refluxed. After the addition of the sulfonyl chloride, 56 g. of product distilling at 88°–110° C. were collected which, when redistilled over calcium hydride through a fractionation column, gave 43 g. of pure tetrahydropyran boiling at 87.5°–88.5° C., representing a yield of 50%. On analysis, the product was found to contain 59.9% carbon, and 11.6% hydrogen, whereas the calculated value for carbon is 69.7% and for hydrogen is 11.6%.

*Example 6.—Tetrahydropyran, 2,4-lutidine-benzenesulfonyl chloride method*

A mixture of 104 g. of 1,5-pentanediol and 300 g. of 2,4-lutidine was heated to reflux in an apparatus similar to that used in Example 5. There were then added 176 g. of benzene sulfonyl chloride dropwise over a period of two hours. Upon distillation there was obtained a product boiling at 80°–95° C., and the product was redistilled over calcium hydride through a fractionating column. The yield of pure product was 35 g., and this product had a boiling point of 87.5°–88.5° C. On analysis the product had a carbon content of 69.9% and a hydrogen content of 11.8%.

*Example 7.—Tetrahydrofuran, pyridine-benzenesulfonyl chloride method*

A mixture of 90 g. of 1,4-butanediol and 300 g. of anhydrous pyridine was heated under reflux in a four-foot glass helices-packed column. There were then added 176 g. of benzenesulfonyl chloride dropwise. Upon distillation, 51 g. of crude product boiling at 63°–70° C. were obtained. Upon redistillation of this product over calcium hydride through a fractionating column 25 g. of tetrahydrofuran boiling at 65° C.–66° C. were obtained. On analysis the product was found to contain 65.9% carbon and 10.8% hydrogen. The calculated amount for carbon was 66.6% and 11.1% for hydrogen.

*Example 8.—Tetrahydrofuran, 2,6-lutidine-benzenesulfonyl chloride method*

This example was identical to that of Example 7 except that 300 g. of 2,6-lutidine were used instead of the pyridine. The yield of redistilled tetrahydrofuran was 42 g. in this example. The boiling point of the product was 65°–66° C. and on analysis, it had a carbon content of 65.9% and a hydrogen content of 10.8%.

*Example 9.—Tetrahydropyran, monobenzenesulfonate of 1,5-pentanediol-2,6-lutidine method*

150 g. of 1,5-pentanediol monobenzenesulfonate were mixed with 300 g. of 2,6-lutidine. The flask was attached to a four-foot column packed with glass helices and equipped with a variable take-off head. The reaction mixture was then refluxed and upon fractionation thereof, 32.4 g. of tetrahydropyran boiling at 70°–90° C. were obtained. When refractionated over calcium hydride through a fractionating column, 21 g. of pure tetrahydropyran were obtained. The residue remaining from the main reaction produce was cooled to room temperature and thereupon it separated into two layers of approximately equal volume. The lower layer was separated. On standing it solidified to a crystalline mass and these crystals were dissolved in ethanol, decolorized and concentrated to a small volume. Again a solid crystalline mass was obtained when recrystallized from an alcohol-ether mixture yielded a product which analyzed as follows:

|  | Per cent |
|---|---|
| Nitrogen | 5.3 |
| and Sulfur | 11.3 |

This material was thus shown to be the 2,6-lutidine salt of benzene sulfonic acid which results from the cyclization reaction. The calculated values for this salt were nitrogen 5.28% and sulfur 12.0%. A mixed melting point with a known sample of addition salt showed no lowering.

When pyridine was used in a similar manner to that illustrated in the above example, a smaller quantity of product was formed. Thus, tertiary amines containing a substituent attached to the carbon atom adjacent to the nitrogen atom of the amine gave yields which are substantially higher than those which contain no such substituent.

The monobenzene sulfonate of 1,5-pentanediol used in the above example was prepared as follows:

A mixture of 2 l. of anhydrous ether, 600 g. of 1,5-pentanediol and 500 cc. of anhydrous pyridine was stirred in a 5 l., 3-necked flask equipped with a thermometer, mechanical stirrer and dropping funnel. The temperature of the reaction mixture was maintained at 5° C. while maintaining the temperature at 5° C., 300 g. of benzenesulfonyl chloride were added dropwise with stirring over a three-hour period. Stirring was then continued for an additional hour and the reaction product was then washed three times with water, once with dilute hydrochloric acid and then twice more with water. The ether layer was dried over calcium chloride and then over anhydrous magnesium sulfate. After removal of the ether layer by concentrated vacuum, 300 g. of a viscous product were obtained

*Example 10.—α,α'-Dimethyltetrahydropyran, γ-picoline-benzene sulfonyl chloride method*

50 g. of 2,6-heptanediol were mixed with 200 g. of γ-picoline and heated to reflux. There were then added 88 g. of benzene sulfonyl chloride dropwise over a period of one hour. On distillation, the following fractions were obtained: First fraction, 17.7 g., boiling at 115°–120° C., second fraction, 11.0 g., boiling at 120°–139° C. On refractionation of the first fraction there were obtained 10 g. of α,α'-dimethyl tetrahydropyran boiling at 115° C.

*Example 11.—α,α' - Dimethyltetrahydropyran, pyridine-benzenesulfonyl chloride method*

50 g. of 2,6-heptanediol and 100 g. of anhydrous pyridine were heated to reflux and 88 g. of benzene sulfonyl chloride added dropwise over a period of 1½ hours. The reaction mixture was then cooled whereupon it set to a solid mass. The product was extracted with ether and the ether extract was washed with dilute sulfuric acid and then with water. After drying over calcium sulfate, the ether solution was concentrated and then distilled to give 18 g. of a product boiling at 115°–120° C. On redistillation of the crude product through a fractionating column, there were obtained 11.0 g. of α,α′-dimethyl tetrahydropyran boiling at 115°–116° C.

Operating in a manner similar to that described in the foregoing examples, other cyclic ethers selected from those of the tetrahydrofuran and tetrahydropyran series can be obtained. For example, by replacing the 2,5-hexanediol of Example 3 by a molecularly equivalent amount of 1,5-hexanediol, α-methyltetrahydropyran can be obtained. In like manner, by replacing the 1,5-pentanediol of Example 8 by a molecularly equivalent amount of 1,4-heptanediol, α-n-propyltetrahydrofuran can be formed. Also, tertiary amines other than those illustrated above can be used. As shown in the examples, when $m$ in Formula I or II above is 3 and the hydroxyl groups are primary hydroxyl groups, it is usually more advantageous to employ a tertiary amine selected from those of the pyridine series and those of the quinoline series, said amine containing an α-alkyl group, such as a methyl, ethyl, n-propyl, isopropyl, n-butyl, etc., group, although the reaction proceeds when unsubstituted amines are employed. Where $m$ is 3 and the hydroxyl groups are secondary hydroxyl groups, or where $m$ is 2 and the hydroxyl groups are primary or secondaryl hydroxyl groups, both α-unsubstituted and α-substituted tertiary amines can be used to advantage. In cases where $m$ is 3 and the hydroxyl groups are primary and an α-unsubstituted amine is employed, there appears to be some quaternization of the intermediate monosulfonate ester and this reaction causes some reduction in the yields of the tetrahydropyran. This is apparently due to the fact that the tetrahydropyran ring is not so easily formed and that some of these α-unsubstituted amines quaternize rather readily. The glycols used in our invention are those wherein the hydroxyl groups are primary or secondary hydroxyl groups, those wherein the hydroxyl groups are tertiary hydroxyl groups being unsuited due to the difficulty with which such glycols can be esterified. Other tertiary amines, e. g., triethyl amine, N,N-dimethylaniline can also be used in our invention, usually less advantageously, however.

The glycol and sulfonyl halide are conveniently employed in substantially equimolar amounts, although a slight excess of sulfonyl halide has been found to be advantageous in removing undesirable moisture from the reaction mixture. As shown above, an excess of amine over the calculated amount called for by Steps A and B can advantageously be used. However, we have found that from about 2 to 6 molecular equivalents of amine for each molecular equivalent of sulfonyl halide are useful for the purposes of our invention. It is to be understood, of course, that these ranges by no means represent the limits of operable ranges of our invention, but are merely representative of the most convenient amounts which can be used.

The cyclic ethers obtained according to our invention are useful as solvents and as intermediates in the preparation of other organic compounds.

What we claim as our invention and desire secured by Letters Patent of the United States is:

1. A process for preparing cyclic ethers comprising heating together an aliphatic glycol containing the group

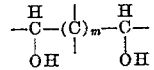

wherein $m$ represents a positive integer from 2 to 3, and a sulfonyl halide selected from those represented by the general formula:

$$R_2-SO_2-X$$

wherein $R_2$ represents a member selected from the group consisting of an alkyl group of the formula $C_nH_{2n+1}$ wherein $n$ represents a positive integer from 1 to 4, an aryl group of the benzene series and an aryl group of the naphthalene series and X represents a member selected from the group consisting of a chlorine atom and a bromine atom, in the presence of a tertiary amine selected from the group consisting of those of the pyridine series and those of the quinoline series, and separating the cyclic ether formed from the reaction mixture.

2. A process for preparing a cyclic ether of the tetrahydrofuran series comprising heating together an aliphatic glycol containing the group

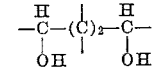

and a sulfonyl halide selected from those represented by the general formula:

$$R_2-SO_2-Cl$$

wherein $R_2$ represents an aryl group of the benzene series, in the presence of a tertiary amine of the pyridine series and separating the cyclic ether formed from the reaction mixture.

3. A process for preparing tetrahydrofuran comprising heating together 1,4-butanediol and a sulfonyl halide selected from those represented by the general formula:

$$R_2-SO_2-Cl$$

wherein $R_2$ represents an aryl group of the benzene series, in the presence of a tertiary amine of the pyridine series and separating the tetrahydrofuran formed from the reaction mixture.

4. A process for preparing tetrahydrofuran comprising heating together 1,4-butanediol and benzenesulfonyl chloride in the presence of a tertiary amine of the pyridine series and separating the tetrahydrofuran formed from the reaction mixture.

5. A process for preparing tetrahydrofuran comprising heating together 1,4-butanediol and benzenesulfonyl chloride in the presence of pyridine and separating the tetrahydrofuran formed from the reaction mixture.

6. A process for preparing a cyclic ether of the tetrahydrofuran series comprising heating together an aliphatic glycol selected from those represented by the general formula:

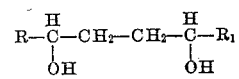

wherein R and $R_1$ each represents a primary alkyl group containing from 1 to 3 carbon atoms, and a sulfonyl halide selected from those represented by the general formula:

$$R_2-SO_2-Cl$$

wherein $R_2$ represents an aryl group of the benzene series, in the presence of a tertiary amine of the pyridine series, and separating the cyclic ether formed from the reaction mixture.

7. A process for preparing α,α'-dimethyltetrahydrofuran comprising heating together 2,5-hexanediol and a sulfonyl halide selected from those represented by the following general formula:

$$R_2-SO_2-Cl$$

wherein $R_2$ represents an aryl group of the benzene series, in the presence of a tertiary amine of the pyridine series, and separating the α,α'-dimethyltetrahydrofuran formed from the reaction mixture.

8. A process for preparing α,α'-dimethyltetrahydrofuran comprising heating together 2,5-hexanediol and benzenesulfonyl chloride in the presence of a tertiary amine of the pyridine series, and separating the α,α'-dimethyltetrahydrofuran from the reaction mixture.

9. A process for preparing α,α'-dimethyltetrahydrofuran comprising heating together 2,5-hexanediol and benzenesulfonyl chloride in the presence of pyridine, and separating the α,α'-dimethyltetrahydrofuran from the reaction mixture.

10. A process for preparing a cyclic ether of the tetrahydropyran series comprising heating together an aliphatic glycol containing the group $$-\underset{\underset{OH}{|}}{\overset{H}{\underset{|}{C}}}-(C)_3-\underset{\underset{OH}{|}}{\overset{H}{\underset{|}{C}}}-$$

and a sulfonyl halide selected from those represented by the general formula:

$$R_2-SO_2-Cl$$

wherein $R_2$ represents an aryl group of the benzene series, in the presence of a tertiary amine of the pyridine series and separating the cyclic ether formed from the reaction mixture.

11. A process for preparing tetrahydropyran comprising heating together 1,5-pentanediol and a sulfonyl halide selected from those represented by the following general formula:

$$R_2-SO_2-Cl$$

wherein $R_2$ represents an aryl group of the benzene series, in the presence of a tertiary maine of the pyridine series, said amine containing a primary α-alkyl group of from 1 to 4 carbon atoms, and separating the tetrahydropyran formed from the reaction mixture.

12. A process for preparing tetrahydropyran comprising heating together 1,5-pentaneidol and benzenesulfonyl chloride in the presence of a tertiary amine of the pyridine series, said amine containing a primary α-alkyl group of from 1 to 4 carbon atoms, and separating the tetrahydropyran formed from the reaction mixture.

13. A process for preparing tetrahydropyran comprising heating together 1,5-pentanediol and benzenesulfonyl chloride in the presence of a tertiary amine of the pyridine series, said amine containing an α-methyl group, and separating the tetrahydropyran formed from the reaction mixture.

14. A process for preparing tetrahydropyran comprising heating together 1,5-pentanediol and benzenesulfonyl chloride in the presence of 2,6-lutidine, and separating the tetrahydropyran formed from the reaction mixture.

15. A process for preparing cyclic ethers comprising heating together an aliphatic glycol selected from those represented by the following general formula:

$$R-\underset{\underset{OH}{|}}{\overset{H}{\underset{|}{C}}}-(CH_2)_m-\underset{\underset{OH}{|}}{\overset{H}{\underset{|}{C}}}-R_1$$

wherein $R$ and $R_1$ each represents an alkyl group of from 1 to 4 carbon atoms and $m$ represents a positive integer from 2 to 3, and a sulfonyl halide selected from those represented by the following general formula:

$$R_2-SO_2-Cl$$

wherein $R_2$ represents an aryl group of the benzene series, in the presence of a tertiary amine of the pyridine series and separating the cyclic ether formed from the reaction mixture.

16. A process for preparing cyclic ethers comprising heating together an aliphatic glycol selected from those represented by the following general formula:

$$CH_3-\underset{\underset{OH}{|}}{CH}-(CH_2)_m-\underset{\underset{OH}{|}}{CH}-CH_3$$

wherein $m$ represents a positive integer from 2 to 3 and a sulfonyl halide selected from those represented by the following general formula:

$$R_2-SO_2-Cl$$

wherein $R_2$ represents an aryl group of the benzene series, in the presence of a tertiary amine of the pyridine series and separating the cyclic ether formed from the reaction mixture.

17. A process for preparing cyclic ethers comprising heating together an aliphatic glycol selected from those represented by the following general formula:

$$CH_3-\underset{\underset{OH}{|}}{\overset{H}{\underset{|}{C}}}-(CH_2)_m-\underset{\underset{OH}{|}}{\overset{H}{\underset{|}{C}}}-CH_3$$

wherein $m$ represents a positive integer from 2 to 3, and benzenesulfonyl chloride in the presence of a tertiary amine of the pyridine series, and separating the cyclic ether formed from the reaction mixture.

18. A process for preparing cyclic ethers comprising heating together an aliphatic glycol selected from those represented by the following general formula:

$$CH_3-\underset{\underset{OH}{|}}{\overset{H}{\underset{|}{C}}}-(CH_2)_m-\underset{\underset{OH}{|}}{\overset{H}{\underset{|}{C}}}-CH_3$$

wherein $m$ represents a positive integer from 2 to 3, and benzenesulfonyl chloride in the presence of pyridine, and separating the cyclic ether formed from the reaction mixture.

DELBERT D. REYNOLDS.
WILLIAM O. KENYON.

No references cited.